United States Patent [19]
Briddell et al.

[11] Patent Number: 5,242,727
[45] Date of Patent: Sep. 7, 1993

[54] ADHESIVE COMPOSITION AND METHOD FOR PROVIDING WATER-TIGHT JOINTS IN SINGLE-PLY ROOFING MEMBRANES

[75] Inventors: Brian J. Briddell; Michael J. Hubbard, both of Jackson, Mich.

[73] Assignee: Adco Products, Inc., Michigan Center, Mich.

[21] Appl. No.: 792,458

[22] Filed: Nov. 15, 1991

Related U.S. Application Data

[63] Continuation-in-part of Ser. No. 637,628, Jan. 4, 1991, abandoned.

[51] Int. Cl.$^5$ .............. C08L 23/16; C08L 23/22; C08L 23/28; C08L 61/06
[52] U.S. Cl. .............................. 428/42; 428/355; 525/145; 525/154; 525/87; 525/236; 525/235; 525/237; 525/240
[58] Field of Search ............... 525/237, 235, 240, 154, 525/236, 87, 145; 428/42, 355

[56] References Cited

U.S. PATENT DOCUMENTS

| | | | |
|---|---|---|---|
| 4,588,637 | 5/1986 | Chiu | 428/355 |
| 4,601,935 | 7/1986 | Metcalf et al. | 428/57 |
| 4,603,164 | 7/1986 | Chmiel et al. | 524/432 |
| 4,671,996 | 6/1987 | Cantor | 428/343 |
| 4,737,528 | 4/1988 | Musch et al. | 523/335 |
| 4,742,119 | 5/1988 | Close | 525/211 |
| 4,855,172 | 8/1989 | Chiu | 428/57 |
| 4,881,996 | 11/1989 | Nussbaum et al. | 156/157 |

*Primary Examiner*—James J. Seidleck
*Assistant Examiner*—W. R. H. Clark
*Attorney, Agent, or Firm*—Killworth, Gottman, Hagan & Schaeff

[57] ABSTRACT

A cured adhesive tape composition for adhering together roofing materials such as synthetic EPDM rubber and which provides long term water tightness is provided. The adhesive composition includes substantially equal amounts by weight of a) a rubbery polymer comprising a blend of an ethylene-propylenediene terpolymer, a halogenated butyl rubber or a halogenated copolymer of p-methylstyrene and isobutylene, and polyisobutylene b) a compatible tackifier, and c) an accelerator/cure package for the rubbery polymer. The cured composition exhibits a peel strength of at least 715 grams/cm at room temperature, at least 300 grams/cm at 70° C., and supports a static load of at least 300 grams at 70° C.

12 Claims, No Drawings

ADHESIVE COMPOSITION AND METHOD FOR PROVIDING WATER-TIGHT JOINTS IN SINGLE-PLY ROOFING MEMBRANES

CROSS REFERENCE TO RELATED APPLICATION

This application is a continuation-in-part of U.S. application Ser. No. 637,628, filed Jan. 4, 1991, now abandoned, the disclosure of which is hereby incorporated by reference.

BACKGROUND OF THE INVENTION

The present invention relates to a cured adhesive composition and method for providing a water-tight seal to joints of roofing membranes, and more particularly to an EPDM-based adhesive and method for joining sheets of EPDM rubber roofing material together.

Roofing materials for covering large roof areas are customarily prepared in wide sheets for installation. Elastomeric ethylene-propylene-nonconjugated diene terpolymer (EPDM) and isobutylene-conjugated diene copolymer (butyl rubber) compositions are well known in the art as roofing materials due to their barrier properties against moisture. These sheets must be overlapped and spliced together to form a continuous, water-tight sheet which covers a roof.

EPDM roof membranes are manufactured to industry standards which permit only a 2% shrinkage in any dimension. Much of the shrinkage is caused by tension when the sheet is calendared and wound on a core and cured. As the EPDM sheet is unwound it recovers, causing the shrinkage. The recovery or shrinkage is dependent on the amount of stress built in during processing (calendaring and winding). If the sheet recovers 2% in a 100 foot roll it will shrink two feet. Seams in EPDM membranes are typically 5 inches for adhesive glues and as narrow as 2.5 inches for tapes. After seaming is accomplished on the roof site, ensuing shrinkage could pull the seams apart if the tape lacks sufficient static load strength.

The first generation of tapes introduced to the industry were uncured compositions that contained curatives. Vulcanization was achieved only after extended exposure to high roof top temperatures. It has been witnessed in roof curing (in situ curing) tapes that sliding of the seam in the shear direction can occur before there is enough time for the adhesive to cure and gain sufficient strength to hold the rubber sheets, and thus the seam, intact.

Besides the normal shrinkage of the EPDM membrane, large variations in temperature can occur shortly after the roof is installed. If the EPDM membrane is seamed during the day while the EPDM membrane is hot, the contraction of the EPDM membrane when the temperature falls at night could result in early seam failure before the adhesive cures. In the spring or fall, the EPDM membrane temperature could change as much as 38° C. from night to day. During the manufacturing of EPDM sheeting stresses are built into the sheet as described above. When the sheet is subsequently rolled out on a roof surface, recovery occurs resulting in reduction in size. The amount of "shrinkage" that results determines the stress forces applied to the bonded seams.

Close, U.S. Pat. No. 4,472,119, is an example of an uncured roofing adhesive composition. The composition is taught to be applied as a liquid dissolved in a solvent. Example I shows a composition which is cured in situ for seven days after application to a roofing membrane. However, the prior art has recognized the shortcomings of such in situ cure adhesives. Chiu, U.S. Pat. No. 4,588,637, in the paragraph bridging columns 1 and 2, describes the problems with uncured adhesive tapes including low initial strengths. Metcalf, U.S. Pat. No. 4,601,935, also describes the shortcomings of in situ curable adhesives, including low initial strengths.

Another method used previously in the art for sealing together the overlapping sheets of roofing material has been to position an unvulcanized rubber tape between the overlapped portions of the roofing membranes and then spot vulcanizing the tape by the application of heat and pressure. However, this method required the presence of a vulcanizing press on the job site. Further, good adhesion required long vulcanizing times which slowed down the installation of the roofing materials.

Yet another method of sealing the overlapping sheets together has been the use of adhesives such as solvent-based neoprene-based adhesives. Problems have been encountered not only with the strength of the adhesive bonds formed at the splices, but also with the long term durability of those bonds. For example, environmental conditions may act to impair the quality of the bond achieved. If conditions are windy, dust and other contaminants may become lodged in the adhesive and impair its ability to adhere the sheets of roofing material together. If there are high temperatures, the adhesive may dry out too quickly. High humidity may cause moisture condensation which interferes with good adhesion. Variations in environmental conditions may require that the workers installing the roof modify their procedures, complicating the installation.

The use of brushes that leave streaks or coatings of uneven thickness are known to reduce bond strength. Neoprene adhesives contain solvents, usually aromatic, such as toluene, xylene, and others. Solvents are environmentally undesirable and subject to increasing regulation. They have toxicity and pose a health hazard. Finally, due to their flammability, a fire hazard exists, and there have been many instances in the industry where fires and injuries have occurred as a result of the use of solvent-based products.

Attempts have been made in the art to develop better adhesives which may be applied more readily and which provide a long term capability to withstand moisture penetration. For example, Streets, U.S. Pat. No. 4,640,730, teaches the use of a styrene-butadiene block copolymer mixed with a hydrocarbon resin as an adhesive for EPDM and butyl rubber-based roofing materials. Chiu, U.S. Pat. Nos. 4,588,637 and 4,855,172, teach a roofing adhesive of a cured butyl rubber-based composition made by compounding a butyl rubber copolymer, a curing agent for the butyl rubber, carbon black, and a compatible tackifier.

Kakehi, U.S. Pat. No. 4,404,056, teaches a cold vulcanizable adhesive tape having a Mooney viscosity of from 5 to 25 which includes a rubbery polymer, a vulcanizing agent, a vulcanizing accelerator, an adhesive agent, and a softening agent. The tape is positioned between overlapping sheets of roofing material, and the sheets are pressed together with a roller or the like.

However, the need still remains in the art for effective adhesive compositions and methods of application for use in adhering together sheets of EPDM-based roofing materials which provides not only ease of application and good strength, but also a long term water-tight seal.

SUMMARY OF THE INVENTION

The present invention meets that need by providing a precured adhesive composition for adhering together roofing materials such as synthetic EPDM rubbers and which provides long term water tightness. The adhesive is soft and initially tacky, yet possesses high initial strength at 70° F., at least in part due to the cured nature of the composition. According to one aspect of the present invention, the adhesive composition includes substantially equal amounts by weight of a) a cured rubbery polymer comprising a blend of an ethylene-propylene-diene terpolymer, a halogenated butyl rubber or a halogenated copolymer of p-methylstyrene and isobutylene, and polyisobutylene and b) a compatible tackifier. Preferably, the tackifier is selected from the group consisting of polybutene, a phenolic resin, and mixtures thereof.

The composition further includes an accelerator/cure package for the rubbery polymer. The composition exhibits a peel strength of at least 715 grams/cm at room temperature, at least 300 grams/cm at 70° C., and supports a static load of at least 300 grams at 70° C., preferably for a minimum of 96 hours. The composition may further include a minor portion of carbon black and other conventional fillers and/or desiccants.

In a preferred form, the adhesive composition of the present invention includes: a) from about 35-45% of a rubbery polymer blend, b) from about 35-45% of a compatible tackifier, and c) from about 1-6% of an accelerator/cure package. The composition is post-cured after extrusion and before use prior to provide a fully cured adhesive having high initial adhesivity and strength. For convenience, the adhesive composition of the present invention may be fabricated in the form of an extruded tape wound in a roll on a release liner. The adhesive tapes are typically about 5.0-15.0 cm wide and about 0.5-1.0 mm thick.

The present invention also includes a method for adhering together sheets of synthetic rubber roofing materials which includes the steps of applying to at least one overlapping edge of the sheets a preformed cured pressure sensitive tape comprising substantially equal amounts by weight of a) a rubbery polymer comprising a blend of an ethylene-propylene-diene terpolymer, a halogenated butyl rubber or a halogenated copolymer of p-methylstyrene and isobutylene, and polyisobutylene and b) a compatible tackifier. The composition further includes an accelerator/cure package for the rubbery polymer. The adhesive composition has a peel strength of at least 715 grams/cm at room temperature, at least 300 grams/cm at 70° C., and supports a static load of at least 300 grams at 70° C. For convenience, the tape is carried on a release liner.

After application of the pressure sensitive seaming tape and removal of the release liner, the overlapping edges of the sheets are pressed together using firm pressure to insure good contact of tape to the sheet material. In a preferred embodiment, the overlapping surface of the sheets are first cleaned with a solvent to remove any traces of grease, oil, or other contaminants which could interfere with the formation of a water-tight seal. No primer need be applied to the sheet surface. However, certain properly formulated primer compositions are known to enhance bond formation and result in higher peel strengths.

The present invention provides an adhesive tape composition which is easy to transport and store, has a long storage life, and can be easily applied at a job site. In use, the adhesive tape provides an initial high adhesion and forms a strong bond and water-tight seal between overlapping sheets of synthetic rubber roofing membrane material. The cured adhesive tape composition is comprised of a sufficiently high crosslink density to provide strong adhesive bonding to the sheets of rubber roofing materials through all widely known roof temperature extremes. The adhesive tape can be applied in a variety of weather conditions and is stable at elevated temperatures which may be encountered on roofs. The composition does not embrittle at low temperatures and remains sufficiently strong and flexible to withstand the expansion and contraction of the roof and underlying roofing materials without seal rupture.

Accordingly, it is an object of the present invention to provide a cured adhesive composition for use in adhering together sheets of EPDM-based roofing materials which provides not only ease of application and good strength, but also a long term water tight seal. This, and other objects and advantages of the invention will become apparent from the following detailed description and the appended claims.

DETAILED DESCRIPTION OF THE PREFERRED EMBODIMENT

By providing a cured adhesive composition which includes substantially equal amounts, by weight, of a rubbery polymer blend and a compatible tackifier, the composition of the present invention is soft and possesses an initial high adhesivity. This permits the formation of a strong initial bond between overlapping layers of roofing material. Additionally, the composition possesses high initial strength and static load resistance so that the joint which is formed remains water tight. Static load resistance is a measure of the adhesive composition's ability to resist expansion and contraction of the roofing membrane while maintaining a water tight seal. The composition may be provided as a preformed adhesive tape which provides ease of application at a job site.

The adhesive tape composition of the present invention preferably comprises, as the rubbery polymer component, a blend of an ethylene-propylene-diene terpolymer, a halogenated butyl rubber or a halogenated copolymer of p-methylstyrene and isobutylene, and polyisobutylene. For example, the ethylene-propylene-diene terpolymer may be Vistalon 2200, 2504, 5600, or 6505, commercial products available from Exxon Chemical; or Royalene 501, 502, 505, 512, or 521, commercial products available from Uniroyal; or EpSyn 2506, 40A, or 4506, commercial products available from Copolymer; or Trilene 65 or 67, low molecular weight terpolymers commercially available from Uniroyal. The halogenated butyl rubber may be a compound such as Bromobutyl 2030 or X-2, or Chlorobutyl 1240 or 1255, commercial products available from Polysar; or Bromobutyl 2222 or 2244, or Chlorobutyl HT-1065, HT-1066, or HT-1068, commercial products available from Exxon Chemical. The halogenated copolymer of p-methylstyrene and isobutylene may be a compound such as Bromo XP-50 commercially available from Exxon Chemical. The halogenated p-methylstyrene/isobutylene copolymer combines the low permeability properties of a butyl rubber with the environmental and aging properties of an EPDM rubber.

The polyisobutylene component of the composition may be, for example, Vistanex L-80, L-100, L-120, or L-140, commercial products available from Exxon Chemical; or Oppanol B-50 or B-100, commercial products available from BASF Corporation; or a low molecular weight polyisobutylene such as LMMS or LMMH, commercial products available from Exxon Chemical; or Oppanol B-10 or B-15, commercial products available from BASF Corporation.

The adhesive tape composition also contains a compatible tackifier in an amount substantially equal to the rubbery polymer. The tackifier gives the composition its softness and high initial adhesivity. Suitable tackifying agents include polybutene, for example Indopol H-100, H-300, H-1500, or H-1900, commercial products available from Amoco Chemical; or Parapol 700, 950, 1300, 2200, or 2500, commercial products available from Exxon Chemical, phenolic resins such as Akron P-90 or P-133, commercial products available from Akrochem; or SP-1068 or SP-1077, commercial products available from Schnectady Chemical; or Durez 31671, a commercial product available from Occidental Chemical; or Dyphene 8318 or 8320, commercial products available from Sherwin-Williams Company, and mixtures thereof.

The adhesive composition also includes an accelerator/cure package for the rubbery polymer component. The rubbery composition may be cured using any of several well-known curing systems including sulfur and sulfur-containing systems as well as zinc oxide. Typically, about 0.2 to about 2.0% by weight of curing agent in the composition is sufficient. The addition of a small amount of zinc oxide, 1-2% by weight, improves the high temperature stability of the composition as well.

Suitable curing accelerators for use in the present invention include sulfur, thiazoles, thiurams, and dithiocarbamates. For example, dipentamethylene thiuram hexasulfide, tetraethyl thiuram disulfide, tetramethyl-/ethyl thiuram monosulfide, tetramethyl thiuram disulfide, tetramethyl thiuram monosulfide, 4,4'dithiodimorpholine, 2-(morpholino-dithio)-benzothiazole, zinc dibutyl phosphorodithiate, 2-mercaptobenzo-thiazole, benzothiazyl disulfide, zinc mercaptobenzothiazole, zinc dibutyl dithiocarbamate, zinc diethyl dithiocarbamate, zinc dimethyl dithiocarbamate, copper dibenzyl dithiocarbamate or tellurium diethyl dithiocarbamate, and mixtures thereof, commercial products available from Akrochem, R. T. Vanderbilt, Akzo, E. I. du Pont de Nemours and Company, Mobay, Monsanto Chemical Company, Pennwalt, or Uniroyal Chemical. Again, only small amounts of an accelerator are required. Typically from about 0.5 to about 2.0% by weight of accelerator in the composition is sufficient. The composition may further include a minor portion of carbon black and/or other conventional fillers or desiccants such as calcium oxide (lime).

The composition, after extruding onto a release liner, is heat cured to cure the rubbery polymer. Typically, the composition is heated to a temperature of about 100° C. to about 125° C. for a period of between about 2-6 hours to achieve essentially full crosslinking. Temperature limits have been established to protect the paper release liners used during cure. However, temperatures of 149° C. and above could be used if a heat resistant liner such as a polyester (Mylar) was used, thereby reducing the time required to obtain a proper degree of cure.

All of the compositions of the present invention exhibit peel strengths of at least 715 grams/cm at room temperature, at least 300 grams/cm at 70° C., and support a static load of at least 300 grams at 70° C. All compositions of the present invention provide both high initial adhesion and high initial strength at 70° C. Without the high initial strength and adhesion, the joined, overlapped roofing materials could slip or be deformed such that the water tightness of the joint is destroyed. Further, because of the long term strength and flexibility, resistance to low temperature embrittlement, and high temperature stability of the adhesive, the joints which are formed remain water tight.

The compositions described above are fully vulcanized to achieve sufficient strength, adhesivity, and static load resistance. Full vulcanization is achieved when further exposure to elevated temperature does not change the adhesivity, strength, or static load resistance. Complete vulcanization enhances these performance properties. The compositions described above are blends of polymers that contribute to the proper balance of properties through its cure potential. Polyisobutylene rubber has no cure potential and thus acts as a polymer diluent. Halobutyl rubber has low to moderate cure capability due to its inherent low unsaturation level of under 2.5%. Ethylene propylene terpolymers have unsaturation levels as high as 10%. The cured blend must have sufficient strength to support a static load of at least 300 grams at 70° C., preferably for a minimum of 96 hours. A maximum of 6.0 mm of slippage with a 300 gram static load at 70° C. is considered acceptable performance. Excessive cure capacity in the composition reduces adhesivity and may result in seam failure. If the composition is not fully cured prior to application, further curing on the roof caused by elevated roof top temperatures may cause the tape to become too strong with accompanying loss of adhesivity.

In order that the invention may be more readily understood, reference is made to the following examples of compositions within the scope of the present invention, which examples are intended to be illustrative of the invention, but are not intended to be limiting in scope.

EXAMPLE 1

The compositions and amounts listed below were charged to a conventional double-arm sigma blade mixer and blended for a period of three hours. The resulting compositions were then extruded into an adhesive tape and cured at a temperature of 100° C. to 125° C. for 3 hours. The resulting compositions had a high initial adhesivity and were measured to have the peel strengths at room temperature and 70° C. and static load resistance at 70° C. reported below.

|  | Parts by Weight (Based on 100 parts EPDM) | | | | | | |
| --- | --- | --- | --- | --- | --- | --- | --- |
|  | 1 | 2 | 3 | 4 | 5 | 6 | 7 |
| Compound Description | | | | | | | |
| EPDM rubber | 100 | 100 | 100 | 100 | 100 | 100 | 100 |
| Halogenated butyl rubber | 60 | 91 | 62 | 98 | 60 | 91 | 25 |
| Polyisobutylene | 50 | 76 | 52 | 82 | 50 | 76 | 50 |
| Antioxidant | 1 | 1 | 1 | 1 | 1 | 1 | 1 |
| Phenolic resin | 44 | 40 | 28 | 72 | 44 | 40 | 27 |
| Zinc oxide | 6 | 9 | 6 | 9 | 6 | 9 | 6 |
| Pulverized lime | 6 | 9 | 6 | 10 | 6 | 9 | 6 |
| Accelerator/Cure package | 9 | 9 | 9 | 15 | 6 | 14 | 9 |
| Carbon Black | 9 | 14 | 9 | 14 | 9 | 14 | 9 |

-continued

| | Parts by Weight (Based on 100 parts EPDM) | | | | | | |
|---|---|---|---|---|---|---|---|
| | 1 | 2 | 3 | 4 | 5 | 6 | 7 |
| Polybutene tackifier | 176 | 189 | 129 | 202 | 123 | 270 | 123 |
| Physical Properties | | | | | | | |
| Static Load Resistance, 70° C., slippage (mm) 300 gram load | 3.0 | 1.0 | 4.0 | 1.0 | 0.0 | 5.0 | 2.5 |
| Peel strength, g/cm, 7 days at room temperature | 715 | 750 | 825 | 790 | 715 | 985 | 750 |
| Peel strength, g/cm, 7 days at 70° C., pulled at 70° C. | 375 | 350 | 350 | 375 | 330 | 300 | 310 |

EXAMPLE 2

A test assembly was constructed to demonstrate how dramatic changes in rooftop temperatures can place very high stress on bonded EPDM seams. This test assembly comprised a 30 cm×30 cm board comprised of 12.7 cm plywood, two 15 cm×30 cm pieces of 1.1 mm thick EPDM sheeting, and clamps at each side of the board for securing the EPDM sheet in place.

A 30 cm×7.5 cm overlap seam was prepared using the EPDM based composition labeled 4 in Example 1. The joined sheet was then conditioned for one hour at 70° C. The joined sheet was then stretched an additional 6 cm and clamped to the plywood board. This was accomplished with the seam positioned in the middle of the board and running parallel to the clamps.

The assembly was then conditioned at −18° C. After 24 hours the seam was examined for slippage or any sign of failure. The assembly was then cycled 10 times as follows: 2 hours at room temperature, followed by 2 hours at 70° C., followed by 24 hours at −18° C.

No evidence of failure was detected. It was concluded that the cured tape of the present invention possessed sufficient strength through the temperature extremes to prevent slippage and resulting seam failure.

EXAMPLE 3

A static load test was conducted in which 5.08 cm by 2.54 cm samples of EPDM membrane were cleaned and a 6.45 square cm area of tape was bonded using the composition labeled 4 in Example 1, leaving 2.54 cm tabs for clamping on each end. The assembly was suspended in a vertical position at 70° C. and a weight of 300 grams was attached. The assembly was evaluated over a period of 7 days to determine the amount of slippage. It was found that up to 300 grams in load produced no slippage.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A cured adhesive composition for adhering together EPDM roofing materials comprising substantially equal amounts by weight of a) a rubbery polymer comprising a blend of an ethylene-propylene-diene terpolymer, a halogenated butyl rubber or a halogenated copolymer of p-methylstyrene and isobutylene, and polyisobutylene and b) a compatible tackifier, said composition further comprising an accelerator/cure package for said rubbery polymer, said composition being fully vulcanized prior to use by heating to achieve essentially full crosslinking of the components, said composition having a peel strength of at least 715 grams/cm at room temperature, at least 300 grams/cm at 70° C., and supports a static load of at least 300 grams at 70° C.

2. The composition of claim 1 further including a minor portion of carbon black.

3. The composition of claim 1 in which said tackifier is selected from the group consisting of polybutene, a phenolic resin, and mixtures thereof.

4. A cured adhesive composition for adhering together roofing materials consisting essentially of: a) from about 35–45% of a rubbery polymer, b) from about 35–45% of a compatible tackifier, c) from about 5–9% of a plasticizer, and d) from about 1–6% of an accelerator/cure package, the resulting composition being fully vulcanized prior to use by heating to achieve essentially full crosslinking of the components, said composition being cured sufficiently to support a static load of at least 300 grams at 70° C., have a peel strength of at least 715 grams/cm at room temperature and at least 300 grams/cm at 70° C.

5. The composition of claim 4 in which said rubbery polymer comprises a blend of an ethylene-propylene-diene terpolymer, a halogenated butyl rubber, and polyisobutylene.

6. The composition of claim 4 in which said rubbery polymer comprises a blend of an ethylene-propylene-diene terpolymer, a halogenated copolymer of p-methylstyrene and isobutylene, and polyisobutylene.

7. The composition of claim 4 in which said tackifier is selected from the group consisting of polybutene, a phenolic resin, and mixtures thereof.

8. The composition of claim 4 in which said plasticizer is liquid polyisobutylene.

9. A roofing membrane adhesive tape comprising a layer of a cured adhesive composition in the form of a strip on a release liner, said adhesive composition comprising substantially equal amounts by weight of a) a rubbery polymer comprising a blend of an ethylene-propylene-diene terpolymer, a halogenated butyl rubber or a halogenated copolymer of p-methylstyrene and isobutylene, and polyisobutylene and b) a compatible tackifier, said composition further comprising an accelerator/cure package for said rubbery polymer, said composition having been postcured after formulation but before use by heating to achieve essentially full crosslinking of the components and having a peel strength of at least 715 grams/cm at room temperature, at least 300 grams/cm at 70° C., and supports a static load of at least 300 grams at 70° C.

10. The composition of claim 9 further including a minor portion of carbon black.

11. The composition of claim 10 in which said tackifier is selected from the group consisting of polybutene, a phenolic resin, and mixtures thereof.

12. A roofing membrane adhesive tape comprising a layer of a cured adhesive composition in the form of a strip on a release liner, said adhesive composition comprising substantially equal amounts by weight of a) a rubbery polymer comprising a blend of an ethylene-propylene-diene terpolymer, a halogenated copolymer of p-methylstyrene and isobutylene, and polyisobutylene and b) a compatible tackifier, said composition further comprising an accelerator/cure package for said rubbery polymer, said composition having been postcured after formulation but before use and having a peel strength of at least 715 grams/cm at room temperature, at least 300 grams/cm at 70° C., and supports a static load of at least 300 grams at 70° C.

* * * * *